Sept. 9, 1969     H. H. STUECKLE     3,466,089

SELF-LEVELING TRACTOR SEAT

Filed Jan. 22, 1968     2 Sheets-Sheet 1

Harvey H. Stueckle
INVENTOR.

Sept. 9, 1969     H. H. STUECKLE     3,466,089
SELF-LEVELING TRACTOR SEAT
Filed Jan. 22, 1968     2 Sheets-Sheet 2

Harvey H. Stueckle
INVENTOR.

United States Patent Office 3,466,089
Patented Sept. 9, 1969

3,466,089
SELF-LEVELING TRACTOR SEAT
Harvey H. Stueckle, Rte. 2,
Oakesdale, Wash. 99158
Filed Jan. 22, 1968, Ser. No. 699,529
Int. Cl. B60n 1/02
U.S. Cl. 297—314                                                4 Claims

ABSTRACT OF THE DISCLOSURE

For a tractor and like implements, a seat having mounting means supporting the seat for lateral tilting movements about an axis generally longitudinal of the implement and spaced upwardly above the seat level so as to minimize the relative movement of an operator's hands and feet with respect to the implement controls during tilting movements.

---

My present invention is an improved seat for operators of side hill tractors and relates particularly to seats, mounted upon tractors, for tilting movement about a generally longitudinal axis.

It is well known in the art to which this invention appertains to provide seats rotatable about a generally longitudinal axis so that the operator of the tractor may remain substantially vertical even though the tractor is laterally tilted while operating on side hills. However, the prior art is deficient in some respects because heretofore the tilting movement of the operator's seat tended to displace the operator's extremities with respect to the tractor controls in proportion to the amount of tilting movement of the operator from perpendicular with respect to the tractor.

The present invention overcomes this undesirable reaction to the tilting movement by elevating the axis of tilt above the seat to a point more nearly coinciding to a plane coincidental to the femurs of the operator's legs while in a seated position, thus substantially eliminating the displacement of the operator's feet with respect to the controls.

It is a further object of the present invention to provide means for releasably fixing the seat at selected angles when this is desirable and also to provide a seat tilting limit in each direction of tilt which will serve as a gauge to warn the operator when the side hill inclination of the tractor is approaching the maximum safe angle.

Yet another object of the invention lies in the provision of a tractor seat of the character described which is very simple in construction using a minimum number of parts which are readily available and therefore one which may be produced at minimal cost.

The foregoing and other objects and advantages of the present invention will become more apparent and meaningful during the course of the following specification when considered in association with the accompanying drawings wherein a preferred form of the invention is graphically illustrated. It is to be understood, however, that the drawings are illustrative only and are not intended to limit the scope of the invention. It should also be understood that various changes in construction may be resorted to in the course of manufacture without in any way departing from the spirit of the invention, which is to be understood only in accordance with the appended claims. Furthermore, it should be understood that while the invention is described in one particular field of utility, it is not my intention to so limit my invention's applicability, but I desire to reserve to myself the claimed invention for every use of which it is now known to be or subsequently discovered to be susceptible.

The preferred embodiment of the invention, as disclosed in this specification and the related drawings, consists in a seat mounting having a portion fixed relative to the tractor and a companion portion tiltable about an axis longitudinal of the tractor and disposed above the level of the seat sufficiently to minimize displacement of the operator's feet with respect to the foot controls. As the axis is elevated toward the shoulders, it also reduces the amount of displacement of the operator's hands with respect to the hand controls, thus minimizing the need to lean forward.

Other advantages and features of this invention will become apparent from the more detailed description following in which like reference numerals are employed to designate similar parts in the accompanying drawings wherein.

Having reference now more particularly to the drawings, a crawler type tractor is indicated in its entirety by the numeral 10. It will be understood, however, that the tractor need not be of the crawler type but may be of the wheeled type and it may not necessarily be a tractor but any machine or implement which is required to traverse undulating surfaces and upon which one must ride and which is not self-leveling.

Figure 1:
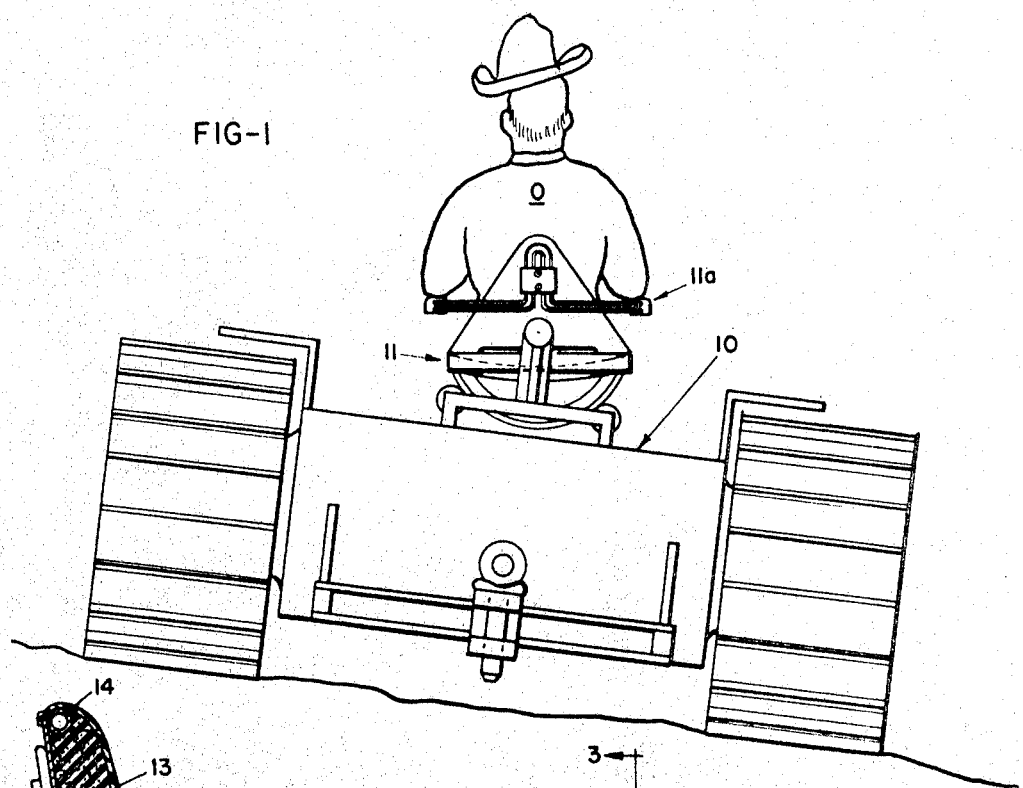
FIGURE 1 is a rear view of a tractor traversing a side hill and including the seat of the present invention.
Figure 2:
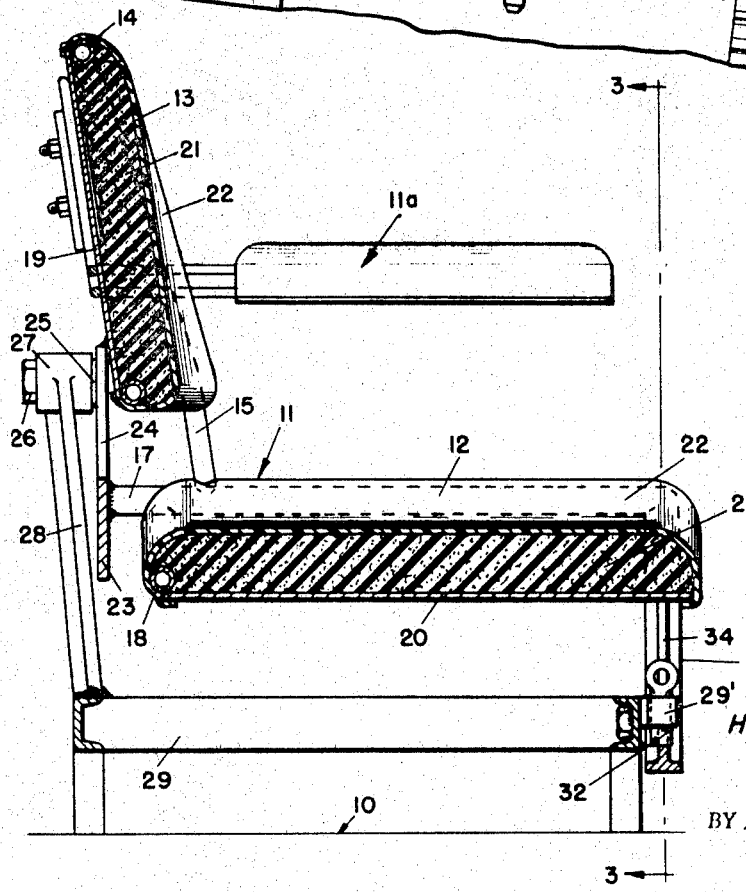
FIGURE 2 is a vertical longitudinal section taken through the seat in a perpendicular position.
Figure 3:
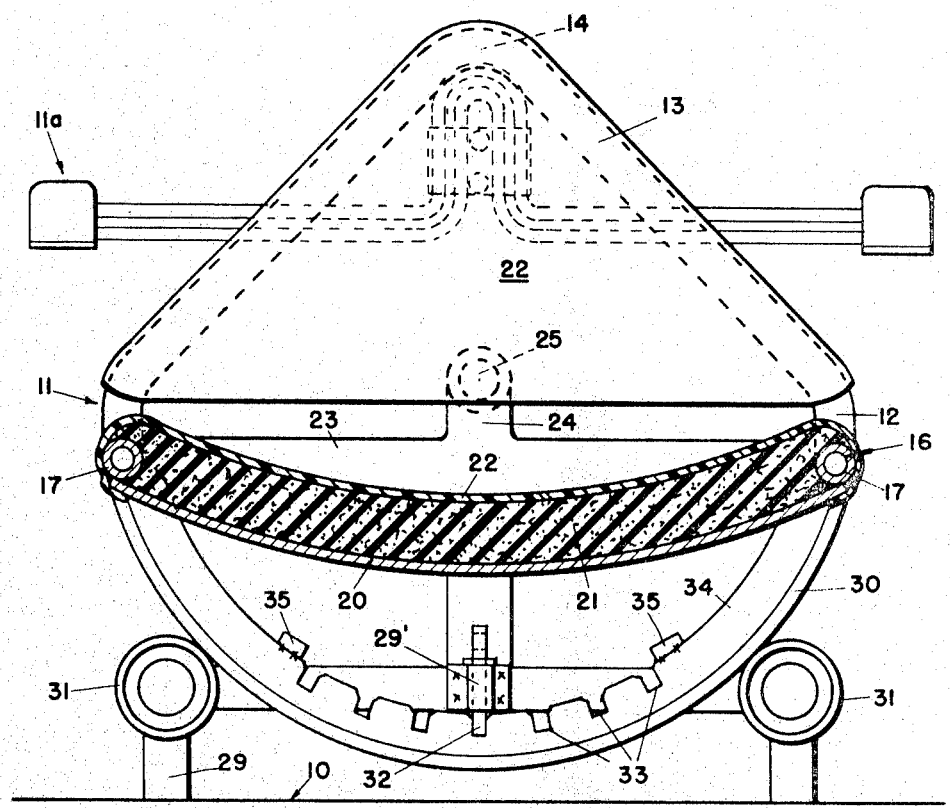
FIGURE 3 is a lateral vertical view taken substantially on the plane indicated by line 3—3 of FIGURE 2.

Reference numeral 11 indicates in its entirety a machine operator's chair or support which includes a seat 12 having an arcuate configuration as seen clearly in FIGURE 3 and including a back rest 13 both of which are padded at strategic locations for the comfort of the operator. I have shown a tubular frame 14 which is substantially rectangular when viewed from the front, as seen in FIGURE 3, insofar as the back rest portion is concerned, and is secured by connecting legs 15 to the substantially U-shaped portion 16 constituting side bars 17 and an arcuate rear member 18 which interconnects the side bars 17. In both the back rest portion 13 and the seat 12 a bottom or back side is closed by welding or otherwise fixing a piece of sheet metal 19 or 20 which forms a support for the resilient cushion material 21 covered by a suitable covering material 22. The side bars 17 extend rearwardly to a cross bar 23 and are welded or otherwise secured fixed thereto.

A vertical flange 24 extends upwardly from the cross bar 23 and carries a journal member 25 which is here seen to be an axially horizontal spindle releasably and rotatably secured by a removable nut 26 in the journal bearing 27 supported on the upper end of a post 28 rigidly fixed and carried by the frame 29 which is adapted to be fixed in any convenient manner to the tractor 10.

At its forward edge, the seat 12 has an arcuate rail 30 having its ends welded or otherwise secured to the side bars 17 and extending laterally of the seat 12. Frame 29 has journaled thereon rollers 31—31 which cooperate with the rail to support the front edge of the seat 12. The rail is substantially centrosymmetric to the axis of the journal 25–27 so that the seat may be supported for axial rotation at the rear and front and still dispose the axis above the level of the seat 12.

A manually actuable dog 32 is carried by the fixed frame 29 and adapted for movement into and out of locking engagement with a series of slots 33 formed in the flange 34 of the T-shaped rail 30. The flange 34 is also provided with stops 35 which strike a portion 29′ of the frame 29 and thus limits the tilting movements of the seat 12 about the axis of journal 25–27.

The stops 35 are selectively positioned and fixed with respect to the particular vehicle with which the seat is to operate so that they will act as gauges to warn the operator O when the lateral inclination of the vehicle is approaching its maximum safe limit for then he will feel the seat begin to angulate, which will automatically warn him to take corrective action.

When one is doing contour work, he may be desirous of securing the seat at a specific angle removed from perpendicular relative to the tractor so he can determine by feel how nearly constant is the inclination of the land.

To accommodate the device to the greatest number of operators, I have provided vertically adjustable arm rests 11A.

The triangular configuration of the back rest having its apex at the top, facilitates freedom of movement of the operator when it is necessary for him to turn himself about in the seat to actuate controls which are located behind the back rest 13.

Having thus described my invention I desire to secure by Letters Patent of the United States the following:

1. In a tractor, a seat, a seat mounting carried by the tractor and providing for lateral tilting movements of the seat about a generally longitudinal axis, and said seat mounting having means disposing said axis spaced vertically above the said seat and at the rear edge thereof;
   an arcuate rail fixed with respect to said seat at its front edge centrosymmetric to said axis; and
   spaced rollers cooperating with said rail constructed and arranged to support the front edge of said seat from the tractor for said tilting movements.

2. The combination of claim 1 and further characterized by said seat having a back rest portion, and said companion journal member being fixed to said back rest portion.

3. The combination of claim 1 and further characterized by a manually releasable latch constructed and arranged to releasably lock said seat at a selected angle of tilt about said axis.

4. The combination of claim 3 and further characterized by stops constructed and arranged to limit the degree of tilt in both directions from perpendicular with respect to said tractor at the limit of safe inclination of said tractor's operation on side hills.

References Cited

UNITED STATES PATENTS

| 937,922 | 10/1909 | Burd | 297—314 XR |
| 1,039,004 | 9/1912 | Young | 297—314 |
| 1,179,598 | 4/1916 | Zink | 297—314 XR |
| 1,246,261 | 11/1917 | Gussett | 297—314 XR |
| 2,672,920 | 3/1954 | Altgelt | 297—314 |
| 2,715,938 | 8/1955 | Miller | 297—314 XR |
| 2,984,290 | 5/1961 | Miller | 297—308 |
| 2,966,937 | 1/1961 | Rydberg | 297—313 |
| 3,315,934 | 4/1967 | Taylor | 248—376 |
| 3,341,165 | 9/1967 | Taylor | 248—376 |

FOREIGN PATENTS 807,336 1/1952 Germany.

BOBBY R. GAY, Primary Examiner

G. O. FINCH, Assistant Examiner